(12) United States Patent
Epperson

(10) Patent No.: US 10,315,714 B2
(45) Date of Patent: Jun. 11, 2019

(54) DOLLY TRAIN WITH IMPROVED OPERABILITY

(71) Applicant: Toyota Motor Engineering & Manufacturing North America, Inc., Erlanger, KY (US)

(72) Inventor: Adam M. Epperson, Haubstadt, IN (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 146 days.

(21) Appl. No.: 15/455,750

(22) Filed: Mar. 10, 2017

(65) Prior Publication Data

US 2018/0257446 A1 Sep. 13, 2018

(51) Int. Cl.
| | | |
|---|---|---|
| B62D 53/00 | (2006.01) | |
| B60Q 9/00 | (2006.01) | |
| B62D 63/08 | (2006.01) | |
| B60Q 5/00 | (2006.01) | |
| B60Q 1/50 | (2006.01) | |
| H04W 84/18 | (2009.01) | |

(52) U.S. Cl.
CPC ............... *B62D 53/00* (2013.01); *B60Q 1/50* (2013.01); *B60Q 5/005* (2013.01); *B60Q 9/00* (2013.01); *B62D 53/005* (2013.01); *B62D 63/08* (2013.01); *H04W 84/18* (2013.01)

(58) Field of Classification Search
CPC .................................. B62D 53/00; B62D 63/08
See application file for complete search history.

(56) References Cited

U.S. PATENT DOCUMENTS

| | | | |
|---|---|---|---|
| 3,860,081 A | 1/1975 | Moll et al. | |
| 5,434,552 A | 7/1995 | Ems | |
| 6,222,443 B1 | 4/2001 | Beeson et al. | |
| 9,840,119 B1* | 12/2017 | Melaragni | B60D 1/36 |
| 2003/0234512 A1* | 12/2003 | Holub | B60D 1/36 |
| | | | 280/432 |
| 2007/0216136 A1* | 9/2007 | Dietz | B60D 1/36 |
| | | | 280/477 |
| 2008/0191449 A1 | 8/2008 | Standen | |
| 2010/0039515 A1* | 2/2010 | Dietz | B60D 1/36 |
| | | | 348/148 |

(Continued)

FOREIGN PATENT DOCUMENTS

DE 202018103943 U1 * 9/2018

*Primary Examiner* — Kevin Hurley
(74) *Attorney, Agent, or Firm* — Dinsmore & Shohl LLP

(57) ABSTRACT

A dolly, a dolly towing system and a method of operating a dolly towing system. The dolly includes a wheeled platform with a coupled electric generator and an automated safety interlock assembly. The interlock assembly includes one or more sensors configured to wirelessly detect whether the dolly and tow motor are safely joined to one another. A controller can be powered by a battery or related onboard source of electric current while the dolly or system are stationary, as well as by the generator when the dolly or system are moving. Signals indicative of the joining that are acquired from the sensors can be received and processed by the controller such that suitable circuitry can convey the processed signal in such a way that the signal provides an audible or visual notice of an operational status of the dolly or system to an operator.

20 Claims, 6 Drawing Sheets

(56) References Cited

U.S. PATENT DOCUMENTS

| | | | |
|---|---|---|---|
| 2016/0075387 A1* | 3/2016 | Fong | B62D 63/08 |
| | | | 403/14 |
| 2016/0242356 A1 | 8/2016 | Velderman et al. | |
| 2017/0282658 A1* | 10/2017 | Shepard | B60D 1/36 |
| 2018/0022405 A1* | 1/2018 | Gecchelin | B60D 1/36 |
| | | | 701/23 |
| 2018/0050573 A1* | 2/2018 | Strand | B60D 1/36 |

* cited by examiner

DOLLY TRAIN WITH IMPROVED OPERABILITY

TECHNICAL FIELD

The present specification relates generally to a dolly system that is less likely to experience user-based errors, and in particular to such a system where electric power and operational status of the system is provided automatically upon connection of a dolly or train of dollies to a tow motor.

BACKGROUND

Dollies are used in industrial and manufacturing environments to convey materials between various stations around a factory floor. In a typical configuration such as that found in an automobile production facility, one or more dolly carts are hitched to a tow motor to facilitate the movement of such materials that are heavy, bulky or both. It is known that existing dolly train systems use a manual plug between the power-providing tow motor and the towed dollies. The power may be used to provide lighting (such as that used to indicate an operational status of a dolly, as well as to provide power for dolly-mounted limit switches.

The extra operator effort associated with manual plugging has led operators—either intentionally or unintentionally—to forego such plugging such that dolly trains may be pulled on the factory floor in a so-called "unhooked" configuration. This operating condition is undesirable in that it could lead to safety concerns and potential safety incidents. An example of this manual-based approach is shown in FIG. 1 where an operator 1 is shown plugging in a power-providing electrical connection 5 between a tow motor 10 and a dolly 20 prior to moving the dolly 20 that is outfitted with an electromechanical limit switch 22 that can act as a safety interlock to inform the operator as to whether items being carried on the dolly are in a secured or unsecured position. The author of the present disclosure has determined that it would be beneficial to automate the connectivity between the tow motor and the one or more dollies as a way to avoid such undesirable operating conditions.

SUMMARY

In one embodiment, a dolly is disclosed. The dolly includes a wheeled platform with a mechanical linkage disposed on the platform for selective coupling to a tow motor, an electric generator coupled to the wheeled platform such that rotational movement of at least one wheel of the wheeled platform operates the generator and an automated safety interlock assembly. The interlock assembly includes one or more sensors configured to wirelessly ascertain a connectivity status of the dolly to the tow motor or to another dolly. In addition, the interlock assembly includes a controller cooperative with the sensor or sensors such that signals acquired therefrom can be received and processed by the controller. A power source provides electrical power to at least the controller, sensor or other components that may require electric current to operate, while circuitry can be used to convey the processed signal in such a way that the signal provides notorious indicia of an operational status of the dolly.

In another embodiment, a dolly towing system is disclosed. The system includes a tow motor comprising a wheeled platform and a source of motive power, one or more dollies each selectively coupled to the tow motor and including a wheel platform, and an automated safety interlock assembly. The interlock assembly includes one or more sensors configured to wirelessly ascertain a connectivity status between the tow motor and an adjacent dolly, a controller in signal communication with the sensor (or sensors), a power source cooperative with at least one of the controller and the sensor to provide electrical power, and circuitry responsive to the controller to provide notorious indicia of an operational status of the dolly.

In yet another embodiment, a method of operating a dolly towing system is disclosed. The method includes arranging at least one dolly to include a wheeled platform, an electric generator coupled to the wheeled platform and an automated safety interlock assembly. The interlock assembly includes one or more sensors configured to wirelessly ascertain a connectivity status of the dolly to a tow motor, a controller in signal communication with the sensor or sensors, a power source cooperative with at least one of the controller and the sensor or sensors to provide needed electrical power, and circuitry responsive to the controller. Once the tow motor and dolly are joined to one another, the interlock assembly provides notorious indicia to an operator of the system of an operational status of the system.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments disclosed herein include a dolly train that does not require any connector plugging-based input from the operator using the dolly train, instead making the signal connection between tow motor and dolly automatically through a detector-based approach. Within the present context, such signal connection is automated in that it does not rely upon a separate plugging or related wired connection between the joined tow motor and dolly (or dollies) in order to provide indicia to the operator of the operational status of the dolly or dolly train that is about to be towed. In this way, where a wireless communication can be made between the tow motor and the dolly or dollies being towed, a significant source of potential human error associated with the need to plug the dolly to the tow motor is removed.

Figure 1:
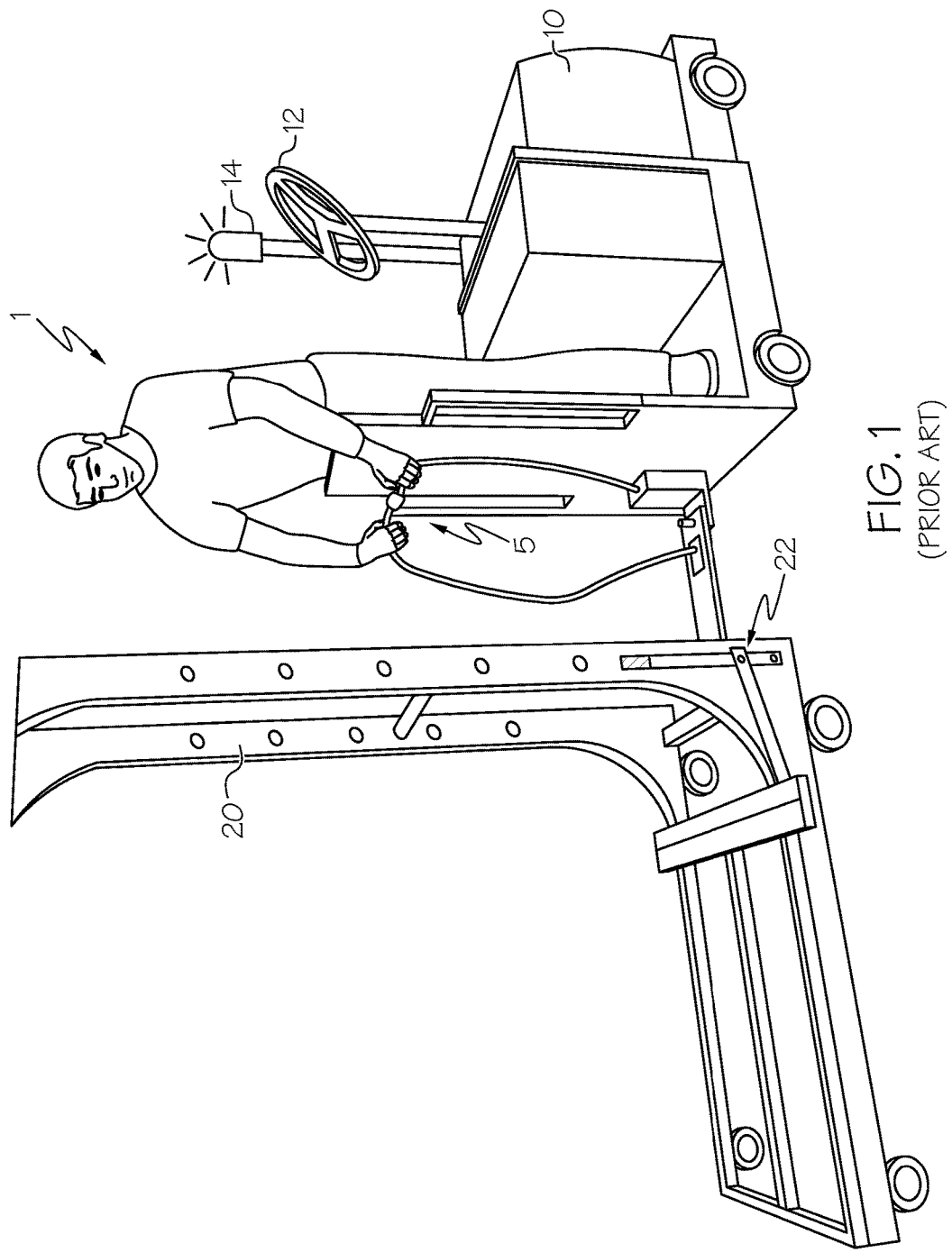
FIG. 1 depicts a dolly towing system in accordance with the prior art.
Figure 2:
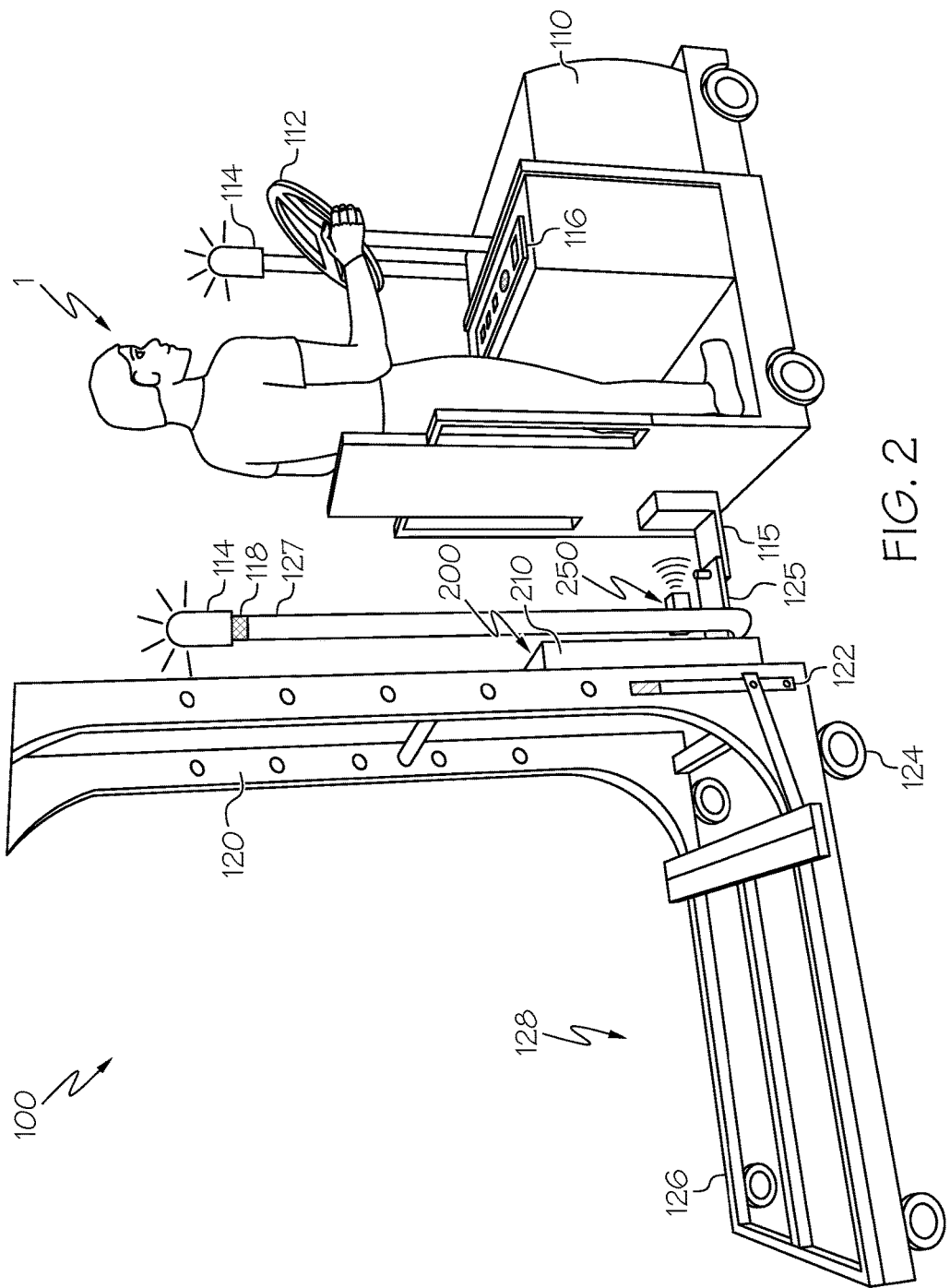
FIG. 2 depicts a dolly towing system in accordance with one or more embodiments shown or described herein.
Figure 2A:
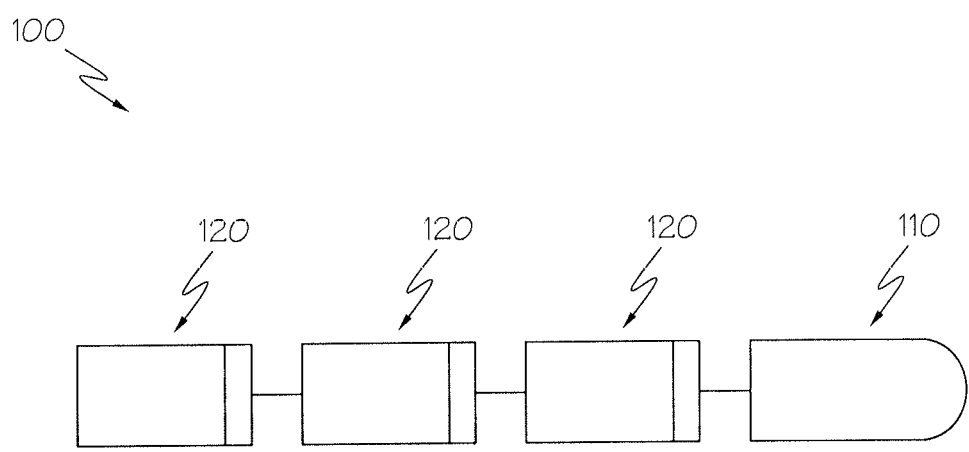
FIG. 2A depicts a schematic illustration of a dolly towing system that includes a plurality of dollies in accordance with one or more embodiments shown or described herein.
Figure 3:
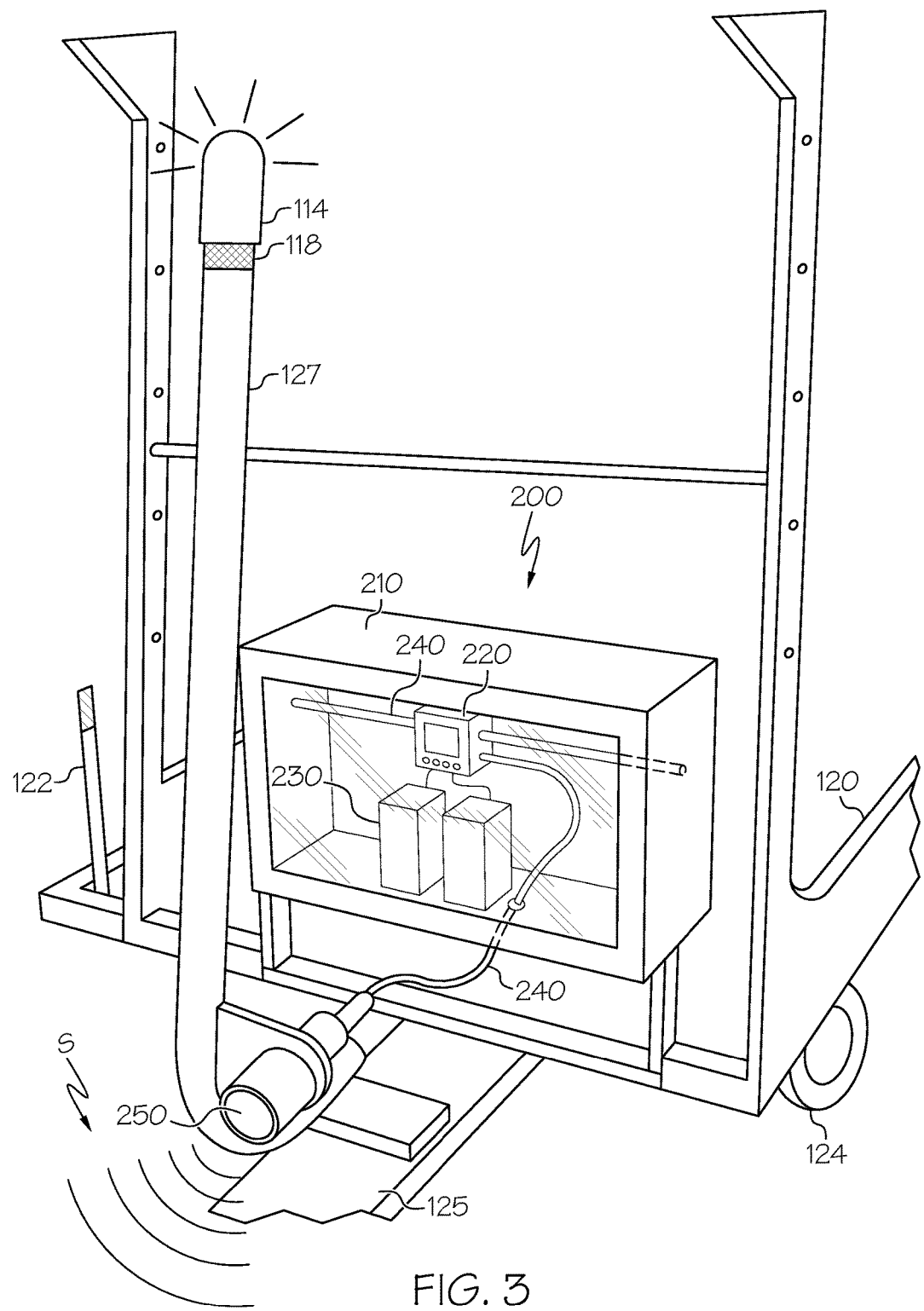
FIG. 3 depicts an automated safety interlock assembly for use on the dolly towing system of FIG. 2.

Referring first to FIGS. 2 and 3, a dolly towing system 100 is disclosed. The system 100 includes a tow motor 110 and one or more dollies 120. Within the present context, although only one dolly 120 is shown, it will be appreciated that numerous such dollies 120 may be arranged in tandem so that the tow motor 110 may tow all such coupled dollies 120 in a manner generally similar to a rail-based locomotive (see FIG. 2A). The tow motor 110 includes a wheeled platform and a source of motive power (such as an electric motor or an internal combustion engine the latter of which is powered by fossil fuels, natural gas or the like). Additional guidance apparatus, such as steering handle or wheel 112 are also provided to allow the operator 1 to exercise control over tow motor 110 propulsion, braking, directional movement or the like. In addition, a lamp 114 may be mounted on a location of the dolly 120 in order to be readily seen by the operator 1, as well as other personnel within visual range. As will be discussed in more detail below, this lamp 114 may be selectively illuminated as a way to provide visual indicia of the operational status of the dolly towing system 100 to such operator 1 or other nearby personnel.

As with the tow motor 110, the dolly 120 includes a platform 126 with wheels 124 to form a wheeled platform 128. Unlike the tow motor 110, the dolly 120 does not have an independent means of providing motive power. Dolly 120 may be secured to the tow motor 110 through a mechanical linkage in the form of a hitch 125 that is sized and shaped to selectively engage a comparable hitch 115 that extends from the back of the tow motor 110; such a hitching arrangement may be any conventional variety, including ball hitch, fifth wheel or the like. In one form, such a hitching or joining approach may also use a switch-based approach to provide independent verification of a secure coupling of the tow motor 110 to the dolly 120 through the hitches 115, 125. In such a configuration, a suitable signal may be sent to the lamp 114 (for example, through a green light) and speaker 118 to indicate whether the dolly 120 is securely coupled, while another signal (for example, a red light and an intermittent audible alarm) is not properly coupled. In one form, the switch-based approach may include an inductive coil situated in or on the hitch so that the plug-free or related wireless connectivity between the two motor 110 and dolly 120 is maintained.

Referring with particularity to FIG. 3, an automated safety interlock assembly 200 is shown, where numerous components that make up the interlock assembly 200 are contained within a housing 210. A controller 220 is contained within the housing 210, and receives its power from a power source 230 made up of one or more capacitive charge storing devices, such as batteries or the like. In one form, a pair of 12-Volt batteries may be connected in series to deliver the electromotive force necessary to provide power to one or more components situated on the dolly 120. Circuitry 240 (shown presently in the form of electrically-conductive wiring) may be used to convey control signals S to and from the controller 220 for processing. In one form, the controller 220 may be in the form of a programmable logic controller (PLC) that can be specifically adapted to provide reliable operation in harsh vibratory and thermal environments, such as those associated with system 100. Regardless of whether configured as a PLC, controller 220 may function as a computer so that automated operation takes place through control logic, program code or a related algorithm in the form of computer-executable (i.e., machine-readable) instructions that can be performed, run or otherwise conducted on the controller 220. Such computer-executable instructions may be written in any programming language, including machine language that may be directly executed by a processor as discussed below, assembly language, object-oriented programming (OOP) language, scripting languages, microcode or the like that may be compiled or assembled and stored in memory as discussed below. Alternatively, the machine readable instructions may be written in a hardware description language (HDL), such as logic implemented via either a field-programmable gate array (FPGA) configuration or an application-specific integrated circuit (ASIC), as well as their equivalents. As such, the system and methods described herein may be implemented in any conventional computer programming language, as pre-programmed hardware elements, or as a combination of hardware and software components.

Figure 5:
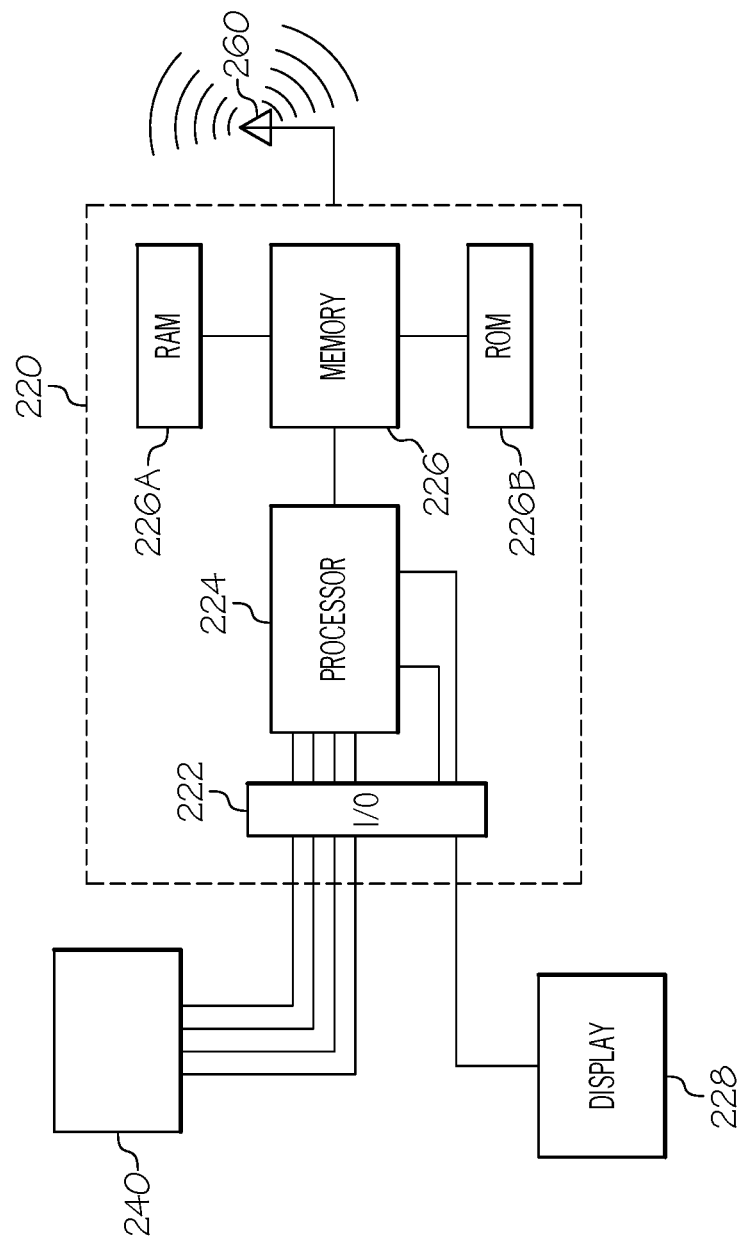
FIG. 5 depicts a block diagram depicting some of the functional units within the dolly towing system of FIG. 2.

Referring next to FIG. 5 in conjunction with FIG. 3, in one form, the controller 220 may be configured to include one or more of an input and output (I/O) 222, a processing unit (often referred to as a central processing unit (CPU) or more generally as a processor) 224 and memory 226 the last of which can temporarily or permanently store such a code, program or algorithm such that the instructions contained in the code are operated upon by the processing unit 224 based on input data received by I/O 222 such that output data generated by the code and the processing unit 224 can be conveyed to another program or a user via I/O 222. It will be appreciated that instead of a single CPU, the processing unit 224 may be in the form of numerous distributed microprocessors or related processing means, and that either variant is deemed to be within the scope of the present disclosure as long as they are capable of executing the machine-readable versions of the control logic, program code or related algorithm. In one form, a data-containing portion of the memory 226—also associated with volatile working memory—is referred to as random access memory (RAM) 226A, while an instruction-containing portion of the memory—also associated with permanent or non-volatile memory—is referred to as read only memory (ROM) 226B. Thus, it will be appreciated by those skilled in the art that computer-executable instructions can be placed within an appropriate location (such as the aforementioned memory 226) within controller 220 in order to achieve the objectives set forth in the present disclosure. In one form, the controller 220 may additionally include additional chipsets (not shown) for peripheral functions. In addition to the control logic, program code or related algorithm, memory 226 may be configured to store object detection logic, object recognition logic, as well as auditory or visual indicia-generation logic, all as described in more detail elsewhere in this disclosure.

Such a controller 220 as discussed herein is generally referred to as having a von Neumann architecture, and is configured to perform the specific automated steps outlined in this disclosure. Upon having the program code means loaded into memory 226 in general (and in one form into ROM 226B in particular), controller 220 becomes a specific-purpose machine configured to determine the parameters associated with system 100 operational status in a manner as described herein. As such, controller 220 becomes a particularly-adapted computer or computer-related data processing device that employs the salient features of such an architecture in order to perform at least some of the data acquisition, manipulation or related computational functions discussed herein. As shown, controller 220 depicts an autonomous (i.e., stand-alone) unit; as will be appreciated by those skilled in the art, in one form it may be the part of a larger network such as those encountered in cloud computing, where various computation, software, data access and storage services may reside in disparate physical locations. Thus, in one form (not shown), all components of the controller 220 need not be located on-board the dolly 120, such as those configurations associated with cloud computing. Such a dissociation of the computational resources does not detract from such a controller 220 and the other components within the interlock assembly 200 being within the scope of the present disclosure.

A data bus or related set of wires forms a suitable data communication path that can act as a local interface for the I/O 222, processing unit 224 and memory 226, as well as any peripheral equipment in such a way as to permit the controller 220 to operate as an integrated whole. The bus may form part of the circuitry 240 and be configured to include control, address and data features, and can be arranged in any conventional format, including controller area network (CAN), local interconnect network (LIN) and related variants. Likewise, a communication path formed by circuitry 240 may signally couple any number of components within the system 100 to one another, regardless of whether they operate in a distributed or stand-alone computing environment. In one form, other devices may be coupled to the I/O 222 (either through the bus or directly), while in another form, such devices may make up the I/O 222, depending on the degree of structural integration where with higher levels of such degree, component redundancy may be reduced or avoided. Within the present context, the visual and audible notorious indicia provided by the lamp 114 and speaker 118 respectively are connected through appropriate circuitry 240 in the form of wiring or related electric current-carrying devices. In one form, at least a portion of the travel path of a signal S being sent from the controller 220 to one or both of the lamp 114 and speaker 118 may be effected by wireless connectivity, such as that associated with transmitting the signal S from the dolly 120 to the tow motor 110 through an antenna 260. In fact, such wireless approach is preferable in that it simultaneously promotes error-free coupling between the tow motor 110 and the dolly 120 while also preserving the plug-free autonomy of each dolly 120. As mentioned elsewhere within the present disclosure, the lamp 114 (or multiple lamps, if necessary)

Referring again with particularity to FIG. 3, the interlock assembly 200 includes one or more sensors 250 that are situated between the front of the dolly 120 and facing the rear or the tow motor 110 so that the sensor or sensors 250 may acquire a signal S that is indicative of a connectivity status between the tow motor 110 and the adjacent dolly 120. By way of example, sensor 250 may be mounted to the hitch 125 or other suitable rigid location on dolly 120 such as through post 127 to allow the sensor 250 to be in a signal-receiving position relative to the rear of the tow motor 110. Although not shown, the sensor 250 may be placed within a ruggedized structure in or around the hitch 125 or post 127 to help protect the sensor 250 from being damaged, so long as such structure does not interfere with the ability of the sensor 250 to send or receive signals S. Thus, in one form, such structure may act as a partial shroud. In one form, the sensor 250 acquires the signal S wirelessly so that the system 100 need not rely upon the operator 1 making a plugged connection between the tow motor 110 and dolly 120 in order to convey the sensed or acquired signal S to the controller 220. As mentioned elsewhere in the present disclosure, each dolly 120 may have a sensor 250 situated on the post 127, front hitch 125 (or on any other suitable forward-facing surface of the dolly 120, for that matter) so that it can send signals S, receive signals S (or both) between it and the tow motor 110. In a particular form, the sensor 250 located on each dolly 120 within a train of dollies 120 may be used to establish indicia of suitable connectivity between adjacent dollies 120 as well, where wireless-based communication of the signals S may be effected through the sensors 250, antenna 260 or the like.

In one form, the sensor or sensors 250 may include one or more of an ultrasonic detector, audio detector, infrared detector, microwave detector, camera and lidar detector. As such, these sensors 250 may be configured to detect radiation in any desirable wavelength band, such as the ultraviolet wavelength band, the near-ultraviolet wavelength band, the visible light wavelength band, the microwave band, as well as various infrared (IR) wavelength bands, including near-infrared, infrared or far-infrared band. In one form, these sensors 250 may interact with the controller 220 through suitable interaction or coupling hardware, such as amplifiers, drivers, digital-to-analog converters, analog-to-digital converters or the like.

For example, the sensor 250 may be configured as a digital camera capable of acquiring still images or digital video images. In such form, the camera acts as an image sensor that may be configured as a charge-coupled device (CCD) or a complementary metal-oxide-semiconductor (CMOS) capable of detecting optical radiation having wavelengths in the visual spectrum, as well as in any suitable resolution, such as standard definition (640 pixels by 480 pixels), high definition (1440 pixels by 1024 pixels, or 1280 pixels by 1024 pixels) or ultra high definition (3840 pixels by 2160 pixels).

Likewise, the sensor 250 may be configured to detect optical radiation in wavelengths outside of the visual spectrum. For example, the sensor 250 may include one or more IR detectors (also referred to as thermal imaging camera, thermographic camera or the like) where the wavelengths tend to be much longer than the 400 to 700 nanometer range of the visible spectrum, often into the micrometer range. In another form, the sensor 250 may be configured to emit and receive microwave radiation, such as millimeter-wave radar (roughly 30 to 300 GHz), K-band (roughly 18 to 27 GHz) or X-band (roughly 8 to 12 GHz), or the like.

In addition, the sensor 250 may be configured to emit and receive coherent optical radiation for circumstances where collimated beam precision and related lack of return signal S estimation is desired. For example, sensors 250 may include one or more lidar sensors that in one form may be made as solid-state devices with few or no moving parts, including those configured as optical phased array devices where its prism-like operation permits a wide field-of-view without the weight and size complexities associated with traditional rotating lidar detectors. As with the radar sensors, lidar sensors are particularly suited to measuring time-of-flight, which in turn can be correlated to distance measurements. As with IR-based sensors, lidar sensors may in one form be operated in or near the infrared range of the electromagnetic spectrum, with one example having emitted radiation of about 905 nanometers.

The sensor 250 may also be in the form of a microphone or related auditory device to capture sound. As with the other sensors 250 discussed herein, the microphone may be configured as capable of receiving auditory signals S, including those that are initially transmitted over antenna 260 or other device configured to wirelessly send a signal S toward a surface of the rear of the tow motor 110 to produce an auditory message capable of being received by the microphone or antenna 260 and then processed (through appropriately-configured hardware, such as amplifiers, drivers, digital-to-analog converts, and the like). In one form, the acoustic signals S being sensed may include sonar for clearance control.

The controller 220—in conjunction with the sensor 250—is configured to automatically detect the proximity of the tow motor 110 relative to the dolly 120, such as through actively sending a signal S and receiving a return signal S or passively receiving a signal S from a surface of the tow motor 110, depending on the way the sensor 250 acquires such signals S. In the former case, the controller 220 may also be configured to automatically recognize the detected object with object recognition (or proximity recognition) software loaded into memory 226. Such proximity recognition software may be configured to automatically recognize one or more of shapes, colors or other indicia associated with the tow motor 110 to help the system 100 identify when the desired degree of proximity associated with the joining of the tow motor 110 to the dolly 120. Through the use of such object recognition software, the controller 220 may receive image data from the sensor or sensors 250 and provide suitable indicia of such proximity.

One or more antennas 260 may be used to effect signal S communication between the interlock assembly 200 and telecommunications networks through near-field wireless networks including one or more of Bluetooth or related Wifi. Within the present context, the term "signal" is meant to include a waveform (for example, in electrical, optical, magnetic, acoustic or electromagnetic form), and that such form may include direct current (DC), alternating current (AC), sinusoidal-wave, triangular-wave, square-wave, vibration and related variants all of which are capable of traveling through a suitable medium. Likewise, the terms "signal communication", "signally coupled", "communicatively coupled" and their variants mean that coupled components are capable of exchanging signals S (whether they be in data or control form) with one another where for example the signals S are electrical signals S conveyed via conductive medium, electromagnetic signals S conveyed over the air, optical signals S conveyed over optical waveguides, or the like. In one form, all such signals S associated with sensor 250 or antenna 260 is performed wirelessly when such signals S are being communicated between the dolly 120 and tow motor 110.

As mentioned above, a combination of some or all of the sensors 250 and other components making up system 1 along with the antennas 260 and their ancillary structure (not shown) will be understood to form a part of a communication system with which to establish a wireless exchange of information In operation, once an operator 1 positions the tow motor 110—such as by backing it up—relative to the dolly 120, the hitches 115, 125 can be made to engage. In the meantime, the battery or batteries 230 that provide power to the interlock assembly 200 permit the sensor 250 to send and acquire signals S to establish when the tow motor 110 is being placed in cooperation with the one or more dollies 120. In one form, the interlock assembly 200 may be in a standby or off mode until such time as a signal S is acquired by the sensor 250 based on proximity of the dolly 120 to the tow motor 110. The dolly 120 further includes a limit switch 122 that can be used to provide indicia of one or more items being carried on the dolly 120. Such switch 122 may be signally coupled to the interlock assembly 200 as an additional safety interlock so that if items placed on the dolly 120 are not properly placed, or exceed a predetermined load, a suitable warning may be sent to one or both of the lamp 114 and speaker 118. Regarding the lamp 114, a green illumination may correspond to either (a) not a single dolly 120 being coupled to the tow motor 110 or (b) at least one dolly 120 being connected and the interlock assembly 200 determines that the dolly towing system 100 is able to be safely moved. Likewise, red illumination may arises from one or more components (such as the limit switch 122) indicating that they are not in a ready-to-move position. In situations where the limit switch 122 is set up as a manually-activated stopper switch such that the switch must be in a closed (i.e., contacted) position prior to movement of the dolly towing system 100, any indication that such switch is not in such a position can be conveyed to the lamp 114 and speaker 118.

Figure 4:
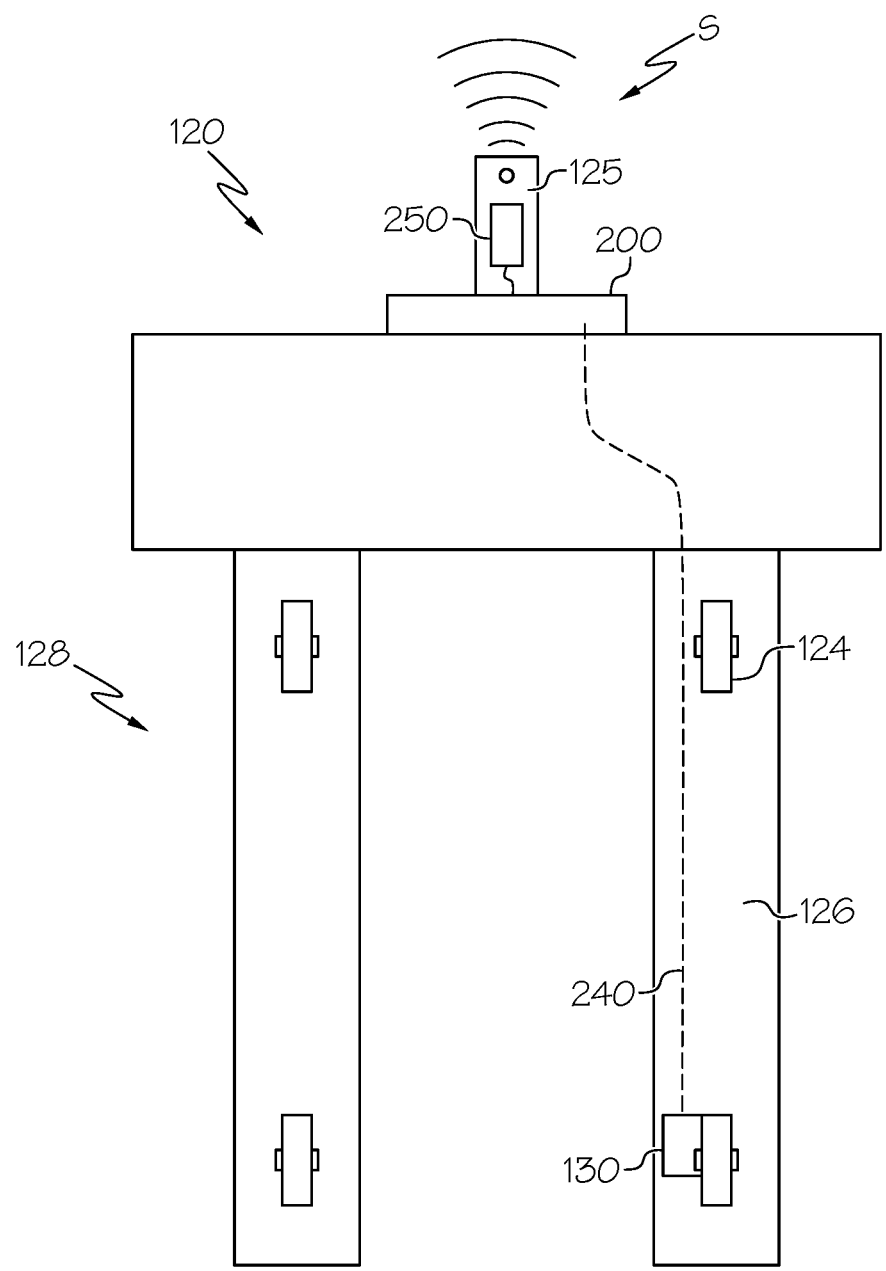
FIG. 4 depicts an underside view of the dolly of FIG. 2.

Referring next to FIG. 4, in one form, the interlock assembly 200 generates the electricity needed through the use of a wheel-mounted generator 130. Because the generator 130 spins while the dolly 120 is in operation (i.e., moving), it charges the automated safety interlock assembly 200 as well as other components that rely upon electric current for their operation, such as limit switch 122 that is situated on the dolly 120, as well as the lamp 114 or speaker 118 that are used to provide notorious indicia of the operational condition (for example, safe or unsafe) of the dolly towing system 100. In another form, electric power for some of the components that are situated on the tow motor 110 may be provided by a separate power source (not shown) that is mounted to the tow motor 110; either variant is deemed to be within the scope of the present disclosure as it relates to providing power to the components that are not directly mounted to or otherwise situated on each dolly 120. As such, prior to movement of a dolly 120 or a train of dollies 120, electric power may be provided by one or more batteries 230 that are situated within housing 210 of the automated safety interlock assembly 200. Likewise, once a dolly 120 that is equipped with the generator 130 starts to move, the rolling motion of the wheel 124 that is coupled to the generator 130 causes the generator 130 to generate electric current such that current needs no longer be supplied by the batteries 230.

In one form, generator 130 may be configured as either an induction variant or a permanent-magnet variant. In one form, it may include a stator and a rotor construction where the stator is made from a magnetic (or magnetizable) hub rotatably mounted on a shaft, while the rotor includes one or more magnets (either permanent magnets or electromagnets) for rotation within or peripherally outside of the stator. Field poles have a coil winding such that in certain forms, the stator is made up of numerous laminated sheets of iron or other non-grain oriented, magnetically permeable material.

The automated safety interlock assembly 200 may also provide indicia of such on/off/standby status, such as by illuminating a light on a control panel 116 of tow motor 110, lead dolly 120 or both. In one form, in addition to having the tow motor 110 being secured to the dolly 120 train, the lamp 114 will only illuminate if other safety interlocks are also engaged; one example of such a safety interlock is a stopper handle (not shown) that is placed on the leading edge of the tow motor 110 that can be easily grasped by the operator. Likewise, another optional feature is to have the lamp 114 being illuminated green when the dolly towing system 100 is in a safe operating condition and illuminated red when it is in an unsafe operating condition.

As such, the power and safety alerts are self-contained to the specific dolly 120 train in that it does not require the operator 1 to hook up the electric limit switch system on the dolly 120 train to the tow motor 110, thereby eliminating the need for operator 1 interaction beyond that associated with driving the tow motor 110. Moreover, the illuminated lighting associated with the dolly towing system 100 provides a constant state of awareness so that all personnel around the dolly 120 train know if it is operating in a safe or unsafe condition.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. For example, the system and methods using the system may be implemented in one or both of software and hardware, and that all variations on the embodiments of such system and method as discussed herein will be understood to be within the scope of the present disclosure. Furthermore, the order of steps associated with such methods may be changed, while various features of the system may be combined, added, removed, reordered, modified or the like, and still be within the scope of the present disclosure. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A dolly comprising:
    a wheeled platform;
    an electric generator coupled to the wheeled platform such that rotational movement of at least one wheel of the wheeled platform operates the generator;
    a mechanical linkage disposed on the platform for selective coupling to a tow motor; and
    an automated safety interlock assembly comprising:
        at least one sensor configured to wirelessly ascertain a connectivity status of the dolly to at least one of a tow motor and another dolly;
        a controller in signal communication with the sensor;
        a power source cooperative with at least one of the controller and the sensor to provide electrical power thereto; and
        circuitry responsive to the controller to provide notorious indicia of an operational status of the dolly.

2. The dolly of claim 1, wherein the notorious indicia comprises at least one of an audible indicia and a visual indicia of the operational status.

3. The dolly of claim 1, wherein the power source comprises at least one battery.

4. The dolly of claim 3, wherein the battery is in electrical communication with the generator such that operation of the generator recharges the battery.

5. The dolly of claim 1, wherein the dolly comprises a plurality of dollies coupled to one another such that only one dolly comprises the interlock assembly disposed thereon.

6. The dolly of claim 1, wherein the dolly comprises a plurality of dollies coupled to one another such that each of the plurality of the dollies comprises the interlock assembly disposed thereon.

7. The dolly of claim 1, wherein the dolly comprises a plurality of dollies coupled to one another such that only one dolly comprises the controller and power source of the interlock assembly disposed thereon, while at least one dolly has the sensor disposed thereon.

8. The dolly of claim 1, further comprising a limit switch cooperative with the automated safety interlock assembly such that the limit switch provides further notorious indicia of the operational status of the dolly.

9. The dolly of claim 1, wherein the sensor comprises at least one of an ultrasonic detector, audio detector, infrared detector, microwave detector, camera and lidar detector.

10. A dolly towing system comprising:
    a tow motor comprising a wheeled platform and a source of motive power;
    at least one dolly selectively coupled to the tow motor, the dolly defining a wheel platform;
    an electric generator coupled to the wheeled platform such that rotational movement of at least one wheel of the wheeled platform operates the generator; and
    an automated safety interlock assembly comprising:
        at least one sensor configured to wirelessly ascertain a connectivity status of the dolly to the tow motor;
        a controller in signal communication with the at least one sensor;
        a power source cooperative with at least one of the controller and the at least one sensor to provide electrical power thereto; and
        circuitry responsive to the controller to provide notorious indicia of an operational status of the dolly.

11. The system of claim 10, wherein at least the controller and the power source is situated on the dolly.

12. The system of claim 10, wherein the dolly forms part of a dolly train comprising a plurality of dollies.

13. The system of claim 12, wherein the sensor is disposed on one of the dollies within the train while the controller and the power source are disposed on another of the dollies within the train.

14. The system of claim 12, wherein the sensor is disposed on one of the dollies within the train while the controller and the power source are disposed on the same dolly within the train.

15. A method of operating a dolly towing system, the method comprising:
    arranging at least one dolly to comprise:
        a wheeled platform;
        an electric generator coupled to the wheeled platform such that rotational movement of at least one wheel of the wheeled platform operates the generator; and
        an automated safety interlock assembly comprising:
            at least one sensor configured to wirelessly ascertain a connectivity status of the dolly to a tow motor;
            a controller in signal communication with the at least one sensor;
            a power source cooperative with at least one of the controller and the at least one sensor to provide electrical power thereto; and
            circuitry responsive to the controller; and
    joining the tow motor to the dolly such that the interlock assembly provides notorious indicia of an operational status of the system to an operator thereof.

16. The method of claim 15, wherein the circuitry further comprises at least one wireless portion thereof in which to convey to at least one alarm disposed on the tow motor a signal corresponding to the notorious indicia.

17. The method of claim 15, wherein the notorious indicia is provided to the operator prior to movement of the joined dolly and tow motor.

18. The method of claim 17, wherein the notorious indicia continues to be provided to the operator after movement of the joined dolly and tow motor.

19. The method of claim 15, wherein the system comprises a plurality of joined dollies each of which have a sensor and a portion of the circuitry disposed thereon but only one of which has the controller and power source disposed thereon.

20. The method of claim 15, further comprising moving the system under motive power from the tow motor such that electric power needed to operate the interlock assembly is provided by the generator.

* * * * *